United States Patent
Yokoyama (10) Patent No.: US 9,454,228 B2
(45) Date of Patent: Sep. 27, 2016

(54) VIBRATING TOUCH PANEL DISPLAY

(75) Inventor: Ryoichi Yokoyama, Kakogawa (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 298 days.

(21) Appl. No.: 13/976,800

(22) PCT Filed: Dec. 27, 2011

(86) PCT No.: PCT/JP2011/080184
§ 371 (c)(1),
(2), (4) Date: Jun. 27, 2013

(87) PCT Pub. No.: WO2012/090998
PCT Pub. Date: Jul. 5, 2012

(65) Prior Publication Data
US 2013/0278561 A1    Oct. 24, 2013

(30) Foreign Application Priority Data

Dec. 28, 2010   (JP) .................................. 2010-291755

(51) Int. Cl.
| G06F 3/045 | (2006.01) |
| G06F 3/01  | (2006.01) |
| G06F 3/041 | (2006.01) |
| G06F 3/044 | (2006.01) |

(52) U.S. Cl.
CPC .............. *G06F 3/016* (2013.01); *G06F 3/041* (2013.01); *G06F 3/044* (2013.01); *G06F 3/0412* (2013.01)

(58) Field of Classification Search
CPC ...... G06F 3/041; G06F 3/044; G06F 3/0412; G06F 3/016
USPC ................................................. 345/174, 173
See application file for complete search history.

(56) References Cited

U.S. PATENT DOCUMENTS

| 7,292,227 | B2* | 11/2007 | Fukumoto | .......... | G01C 21/3664 178/18.04 |
| 7,663,604 | B2* | 2/2010 | Maruyama | ............ | G06F 1/1626 345/156 |
| 7,710,402 | B2 | 5/2010 | Takenaka et al. | | |
| 8,659,558 | B2* | 2/2014 | Huang | .................... | G06F 3/044 178/18.01 |
| 8,937,599 | B2* | 1/2015 | Aono | ...................... | G06F 3/016 178/18.06 |
| 2006/0017705 | A1* | 1/2006 | Yoshikawa | ............. | G06F 3/016 345/173 |
| 2010/0013799 | A1* | 1/2010 | Kim | ...................... | G06F 3/0433 345/177 |
| 2011/0205173 | A1* | 8/2011 | Arai | ........................ | G06F 3/044 345/173 |

FOREIGN PATENT DOCUMENTS

| JP | 2002149312 A | 5/2002 |
| JP | 2003271074 A | 9/2003 |
| JP | 2005092537 A | 4/2005 |
| JP | 2006195734 A | 7/2006 |

OTHER PUBLICATIONS

International Search Report, PCT/JP2011/080184, Jan. 30, 2012, 1 pp.

* cited by examiner

*Primary Examiner* — Kwang-Su Yang
(74) *Attorney, Agent, or Firm* — Volpe and Koenig, P.C.

(57) ABSTRACT

A display device is disclosed. The display device includes a first substrate, a second substrate, a display part, a vibrating body and a vibration transmission member. The first substrate includes a display region and an input region on an outer primary surface thereof, a non-display region outside of the display region on the first substrate, and an input section for detecting a position of an input on the input region. The second substrate includes a second internal primary surface facing a first primary surface of the first substrate. The display part is located between the first substrate and the second substrate. The vibrating body is located on a peripheral region of the second substrate. The vibration transmission member transmits vibration generated by the vibrating body from the second substrate to the first substrate.

8 Claims, 10 Drawing Sheets

VIBRATING TOUCH PANEL DISPLAY

FIELD OF INVENTION

The present invention relates to a display device used in diverse applications such as mobile telephones, digital cameras, portable game consoles, and portable information terminals.

BACKGROUND

In recent years, in display devices having touch panel functionality, there are known display devices which, when a user presses on a screen, cause the user to feel as if a pushbutton switch has been pressed (for example, in Japanese Laid-Open Patent Application Publication 2005-92537).

Such a display device has an input section such as a touch panel, a display panel such as a liquid-crystal panel disposed so as to face the touch panel, a sealing member joining the touch panel and the display panel, and vibrating bodies such as piezoelectric elements provided on the rear face of the touch panel. In such a display device, when a voltage is applied to a piezoelectric element in response to an input to the touch panel, the piezoelectric element vibrates, the input section vibrates with vibration of the piezoelectric element, so that the feeling of pressing is transmitted to the user.

In the display device such as noted above, however, when vibrating bodies are provided on the rear face of the touch panel, because the sealing member is also disposed on the rear face of the touch panel, the sealing member limits the region in which the vibrating bodies can be disposed. As a result, there is the possibility that the vibrating bodies will be entirely or in partly located outside the display panel, thereby leading to the problem of a tendency of an enlarging of the part called the frame, which includes a non-display region located in the peripheral part of the display device.

The present invention has been made in consideration of the above-noted problem, and has an object of suppressing the enlarging of the frame of a display device.

SUMMARY

The display device of the present invention includes a first substrate including a display region and an input region on an outer primary surface thereof, and provided with an input section for being made by contact by an input means with respect to the input region for detecting the input location in the input region; a second substrate disposed such that an interior face thereof and that of the first substrate are in mutual opposition; a display means disposed between the first substrate and the second substrate, for the purpose of displaying image information in the display region; an vibrating body provided on the second substrate causing the input region of the first substrate to vibrate; and an vibration transmission member for transmitting vibration of the vibrating bodies from the second substrate to the first substrate, wherein the vibrating body is entirely provided on a non-display facing region within an outer primary surface of the second substrate, which opposes a non-display region that excludes the display region.

DETAILED DESCRIPTION OF THE PREFERRED EMBODIMENTS

First Embodiment

Figure 1:
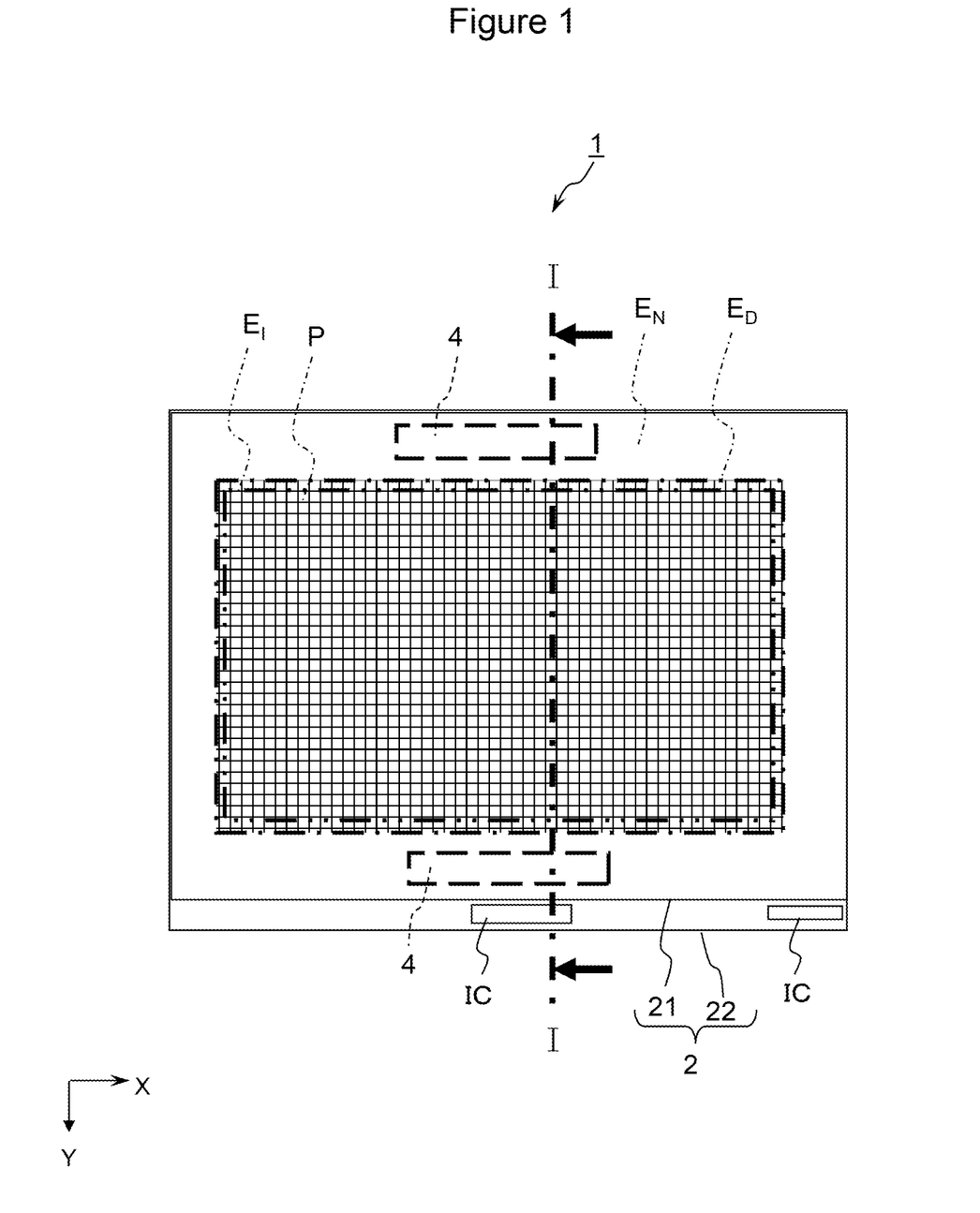
FIG. 1 is a plan view of a display device of a first embodiment of the present invention.
Figure 2:
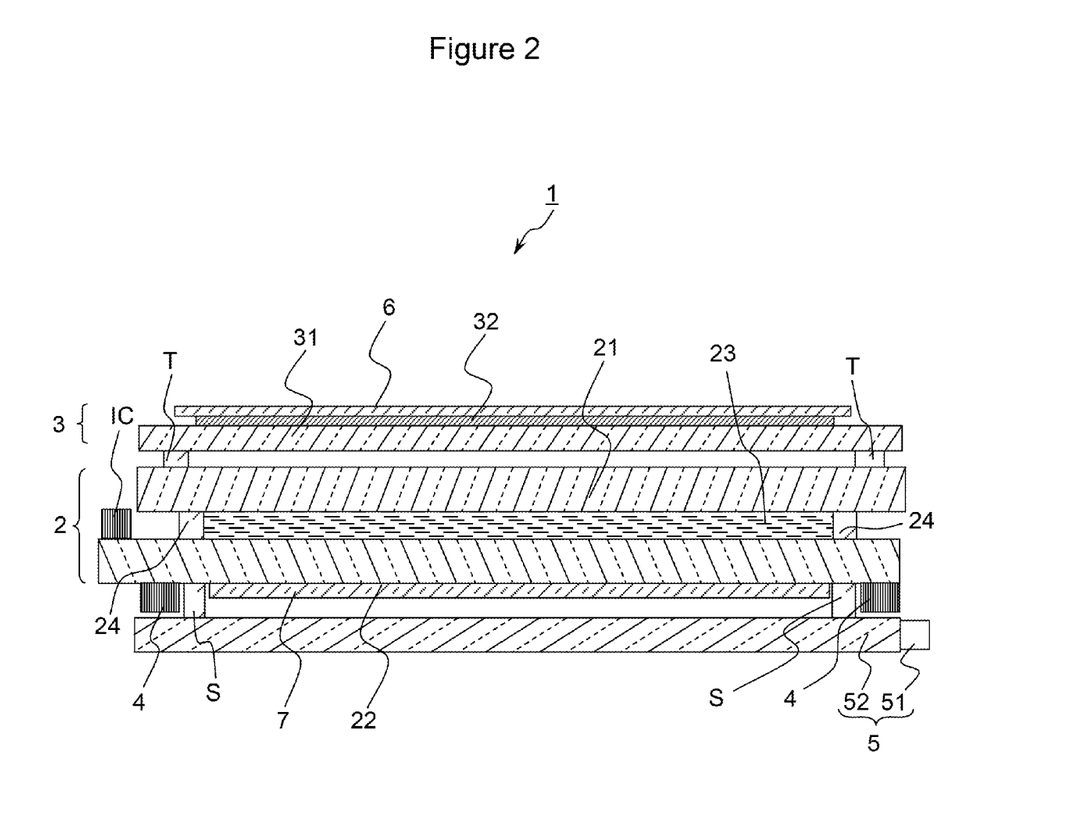
FIG. 2 is a cross-sectional view along the line I-I in FIG. 1.

A display device 1 of the first embodiment of the present invention will be described.

The display device 1 includes a display panel 2, an input section 3 located on located on the display panel 2, vibrating bodies 4 provided on the display panel 2, a light source device 5 that emits light toward a display region ED of the display panel 2, a first polarizing sheet 6 disposed on the input section 3, and a second polarizing sheet 7 disposed between the display panel 2 and the light source device 5.

The display panel 2 includes a first substrate 21, a second substrate 22 disposed to face the first substrate 21, a liquid crystal layer 23 located between the first substrate 21 and the second substrate 22, and a joining member 24 joining the first substrate 21 and the second substrate 22 so as to surround the liquid crystal layer 23.

The display panel 2 of the present embodiment is a liquid crystal display panel that displays image information in the display region ED using the liquid crystal layer 23. That is, the display panel 2 of the present embodiment adjusts the transmissivity of light from the light source device 5 for each pixel P to display an image in the display region ED by a display means that generates an electric field between signal electrodes 228 and common electrode 226 to control the orientation of liquid crystal molecules in the liquid crystal layer 23.

Also, the display panel 2 of the present embodiment adopts a so called lateral electric field method, wherein an electric field is generated between the signal electrodes 228 provided on one of a pair of substrates and the common electrode 226 to control the orientation of liquid crystal molecules in the liquid crystal layer 23. Although this embodiment adopts the lateral electric field method, this is not a restriction, and any method can be used. For example, the vertical electric field method may be adopted.

The display means of the display panel 2 of the present invention is not restricted to one using the liquid crystal layer 23. For example, it may be a display means that uses a light-emitting layer, or the like, such as, a plasma and electroluminescence.

The first substrate 21 includes a first primary surface 21a (outer primary surface) located located on the input section 3 side thereof, and a second primary surface 21b (interior primary surface) located located on the side opposite from the first primary surface 21a. The first primary surface 21a and the second primary surface 21b of the first substrate 21 include a display region ED constituted by a plurality of pixels P, a non-display region EN located located on the outside of the display region ED, and an input region EI located located on the display region ED. The material of the first substrate 21 can be a translucent material, for example, glass, plastic, or the like.

A light-blocking film 211, color filters 212, and a first orientation film 213 are provided on the second primary surface 21b of the first substrate 21.

The light-blocking film 211 is provided in a grid-like pattern on the second primary surface 21b of the first substrate 21. That is, the light-blocking film 211 is provided along the periphery of each of the pixels P. The material for the light-blocking film 211 can be, for example, a resin to which a dye or pigment having a high degree of light blocking (for example, black) is added, or a metal such as chromium. The light-blocking film 211 of the present embodiment is formed as a grid-like pattern, but is not restricted to being a grid-like pattern.

The color filters 212 have the function of passing, of visible light, light of only a specific wavelength. The color filters 212 are provided on the second primary surface 21b of the first substrate 21, at the locations of each pixel P. Each color filter 212 has one of the colors red (R), green (G), and blue (B). The color filters 212 are not restricted to the above-noted colors, and may have, for example, colors such as yellow (Y) and white (W). The material of the color filters 212 can be a resin to which, for example, a dye or pigment has been added.

The first polarizing film 213 has the function of controlling the orientation of liquid crystal molecules of the liquid crystal layer 23. The first polarizing film 213 is provided on the light-blocking film 211 and the color filters 212. The material of the first polarizing film 213 can be a resin such as a polyimide resin.

Figure 3:
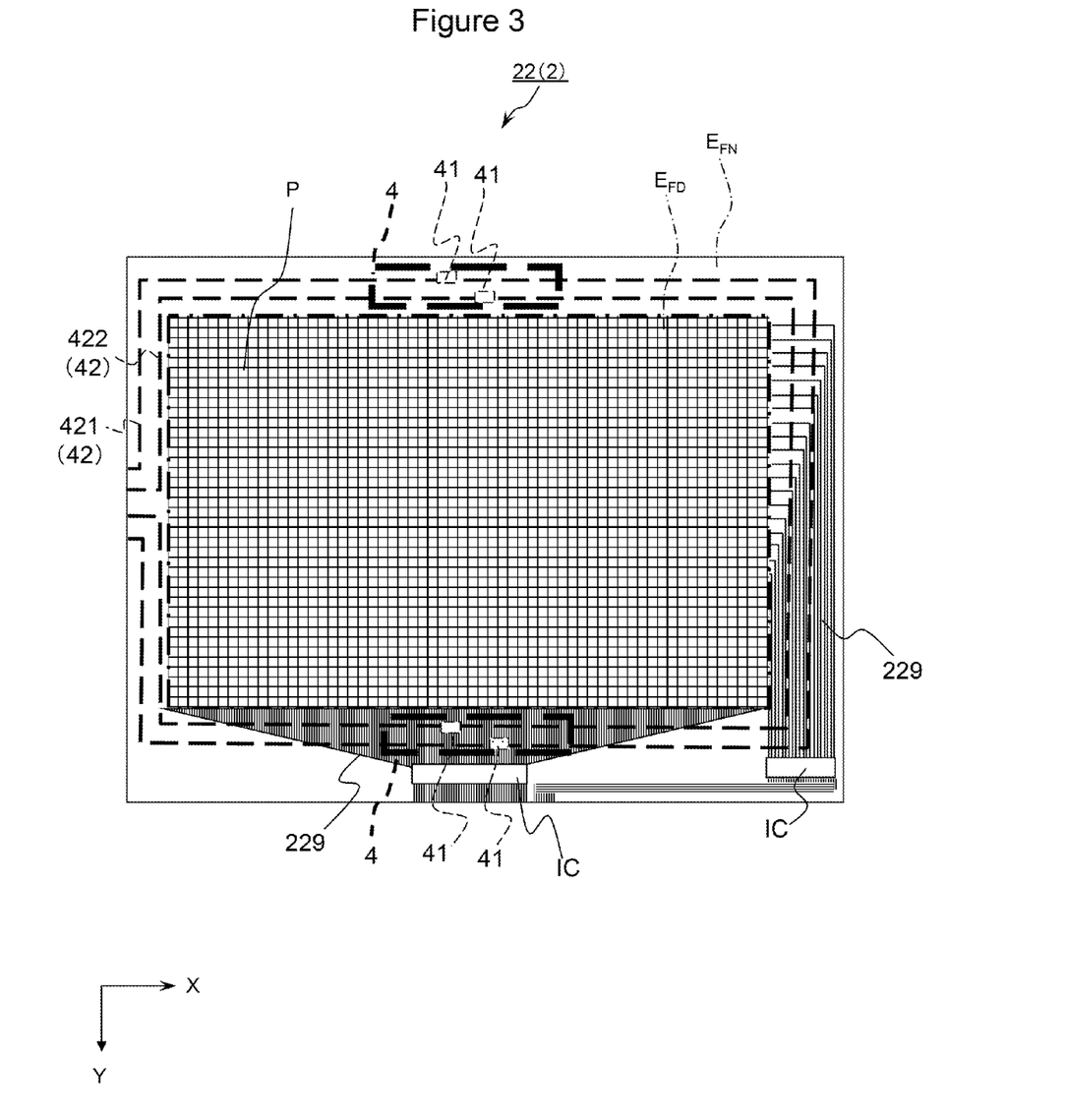
FIG. 3 is a plan view showing a display panel.

The second substrate 22 includes a first primary surface 22a (interior primary surface) facing the second primary surface 21b of the first substrate 21, and a second primary surface 22b (outer primary surface) located located on the side opposite from the first primary surface 22a. The first primary surface 22a and the second primary surface 22b of the second substrate 22 include a display facing region EFD facing the display region ED of the first substrate 21 and a non-display facing region EFN facing the non-display region EN of the first substrate 21. The material of the second substrate 22 is the same as that of the first substrate 21.

Figure 4:
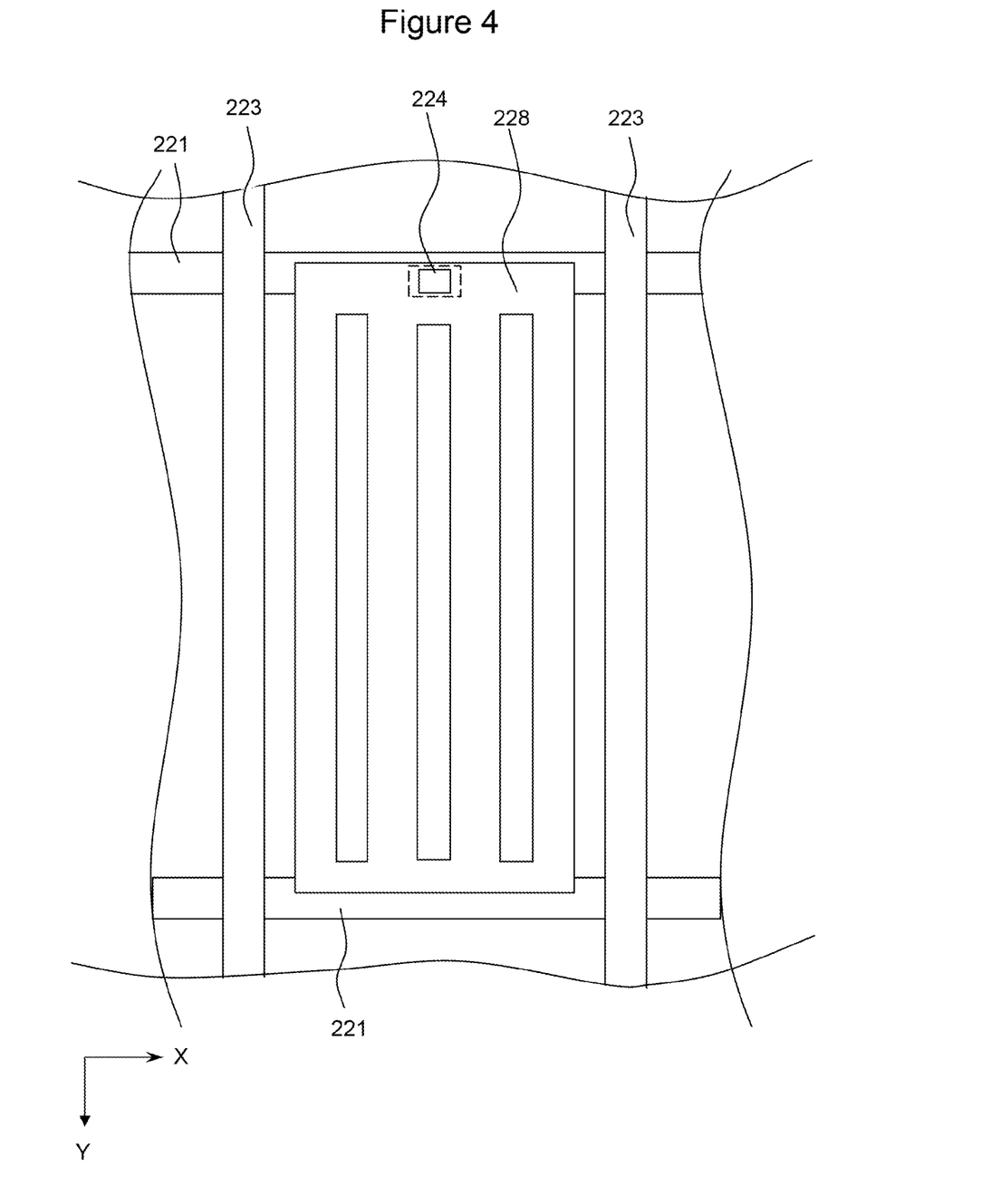
FIG. 4 is a plan view showing pixel electrodes.

On the first primary surface 22a of the second substrate 22 are disposed a plurality of a polarity of gate interconnects 221, a first insulating film 222 provided on the first primary surface 22a so as to cover the plurality of gate interconnects 221, a plurality of source interconnects 223 provided on the first insulating film 222 so as to intersect with the plurality of gate interconnects 221, thin-film transistors 224, a second insulating film 225 provided on the first insulating film 222 so as to cover the plurality of source interconnects 223, a common electrode 226 (display electrode) provided on the second insulating film 225, a third insulating film 227 provided on the second insulating film 225 so as to cover the common electrode 226, a plurality of signal electrodes 228 (display electrodes) provided on the third insulating film 227, display interconnects 229 connected to either one of the gate interconnects 221, a source interconnect 223, or the common electrode 226, a second orientation film 2210 provided on the signal electrodes 228 and the third insulating film 227, and a driver IC connected to the display interconnects 229.

The gate interconnects 221 have the function of applying to the thin-film transistors 224 a voltage supplied from the driver IC. The gate interconnects 221 are located in the display facing region EFD. As shown in FIG. 4, the gate interconnects 221 extend in the X direction. A plurality of gate interconnects 221 are arranged in the Y direction. The gate interconnects 221 are formed from a material having electrical conductivity, such as aluminum, molybdenum, titanium, neodymium, chromium, copper, or alloys containing these.

The first insulating film 222 has the function of electrically insulating the gate interconnects 221 and the source interconnects 223. The first insulating film 222 is formed from a material having insulating properties, such as silicon nitride and silicon oxide.

The source interconnects 223 have the function of applying to the signal electrodes 228, via the thin-film transistors 224, a signal voltage supplied from the driver IC. The source interconnects 223 are located in the display facing region EFD. As shown in FIG. 4 the source interconnects 223 extend in the Y direction. Although the source interconnects 223 of the present embodiment are formed in straight lines, they may be formed bent. The plurality of source interconnects 223 are arranged in the X direction. The source interconnects 223 may be made of the same material as the gate interconnects 221.

The thin-film transistors 224 include a semiconductor layer made of amorphous silicon, polysilicon, or the like, a source electrode that is provided on the semiconductor layer and that is connected to a source interconnect 223, and a drain electrode.

In the thin-film transistors 224, the resistance of the semiconductor layer between the source electrode and the drain electrode changes in response to a voltage applied to the semiconductor layer via a gate interconnect 221, so as to control the write or no-write of an image signal to the signal electrodes 228.

The second insulating film 225 has the function of electrically insulating the source interconnects 223 and the common electrode 226. The second insulating film 225 is formed by a material having insulating properties, such as a resin or the like.

The third insulating film 227 has the function of electrically insulating the signal electrodes 228 and the common electrode 226. The third insulating film 227 may be formed from the same material as that of the first insulating film 222.

The common electrode 226 has the function of generating an electric field between itself and the signal electrodes 228 by application thereto of a voltage from the driver IC. The common electrode 226 is provided on the second insulating film 225 in the display facing region EFD. The common electrode 226 is formed from a translucent and electrically conductive material, such as ITO (indium tin oxide), IZO (indium zinc oxide), ATO (antimony tin oxide), AZO (Al-doped zinc oxide), tin oxide, zinc oxide or an electrically conductive polymer.

The signal electrodes 228 have the function of generating an electric field between themselves and the common electrode 226 by signal voltages supplied from the driver IC. The plurality of signal electrodes 228 are provided on the third insulating film 227, and are located at each pixel P. Although the signal electrodes 228 of the present embodiment are formed rectangularly, the signal electrodes 228 may be formed bent. By doing this, it is possible to divide the pixels P into a plurality of regions, the orientation of liquid crystal molecules being changeable in each region. The signal electrodes 228 may be formed from the same material as that of the common electrode 226.

Although, in the present embodiment, the common electrode 226, the third insulating film 227 and the signal electrodes 228 are provided in this order, this is not a restriction. That is, the common electrode 226 may be formed on the signal electrodes 228, with the third insulating film 227 interposed therebetween, so that the signal electrodes 228, the third insulating film 227, and then the common electrode 226 may be formed in this order.

The display interconnects 229 are interconnects to which voltages for driving the display panel 2 are applied. The display interconnects 229 are connected, for example, to the gate interconnects 221, the source interconnects 223, and the common electrode 226. A plurality of display interconnects 229 are provided on the first primary surface 22a of the second substrate 22, and are located in the non-display region EN.

The second orientation film 2210 has the function of controlling the orientation of liquid crystal molecules of the liquid crystal layer 23. The second orientation film 2210 is provided on the signal electrodes 228 and the third insulating film 227.

The driver IC has the function of controlling the drive of the gate interconnects 221, the source interconnects 223, and the like. The driver IC is located on the second primary surface 22a of the second substrate 22 in the display facing region EFN. The driver IC is provided along a side of the first substrate 21. A plurality of display interconnects 229 are connected to the driver IC.

The liquid crystal layer 23 is provided between the first substrate 21 and the second substrate 22. The liquid crystal layer 23 includes liquid crystal molecules such as a nematic liquid crystal and a cholesteric liquid crystal.

The joining member 24 has the function of adhering the first substrate 21 and the second substrate 22. The joining member 24 is provided between the first substrate 21 and the second substrate 22, so as to surround the display region ED. The joining member 24 is formed of a resin or the like having adhesiveness.

The input section 3 is provided on the first primary surface 21a of the first substrate 21. In the present embodiment, the input section 3 is provided on the first primary surface 21a of the first substrate 21, with a sealing member T interposed therebetween. The sealing member T is provided so as to surround the four sides of the display region ED. The material of the sealing member T can be a resin having adhesiveness.

In the display device 1, because the vibrating bodies 4 are provided on the second primary surface 22b of the second substrate 22 rather than on the input section substrate 31, the region for forming the sealing member T is not restricted by the vibrating bodies 4. As a result, the joining strength between the input section 3 and the display panel 2 can be improved, and it is easier to transmit the vibration of the vibrating bodies 4 to the user.

The input section 3 of the present embodiment adopts the capacitive method as a detection method. Although the input section 3 of the present embodiment adopts the capacitive method, this is not a restriction and, for example, a resistive-film method, a surface acoustic wave method, an infrared method, or an electromagnetic induction method may be adopted.

Figure 5:
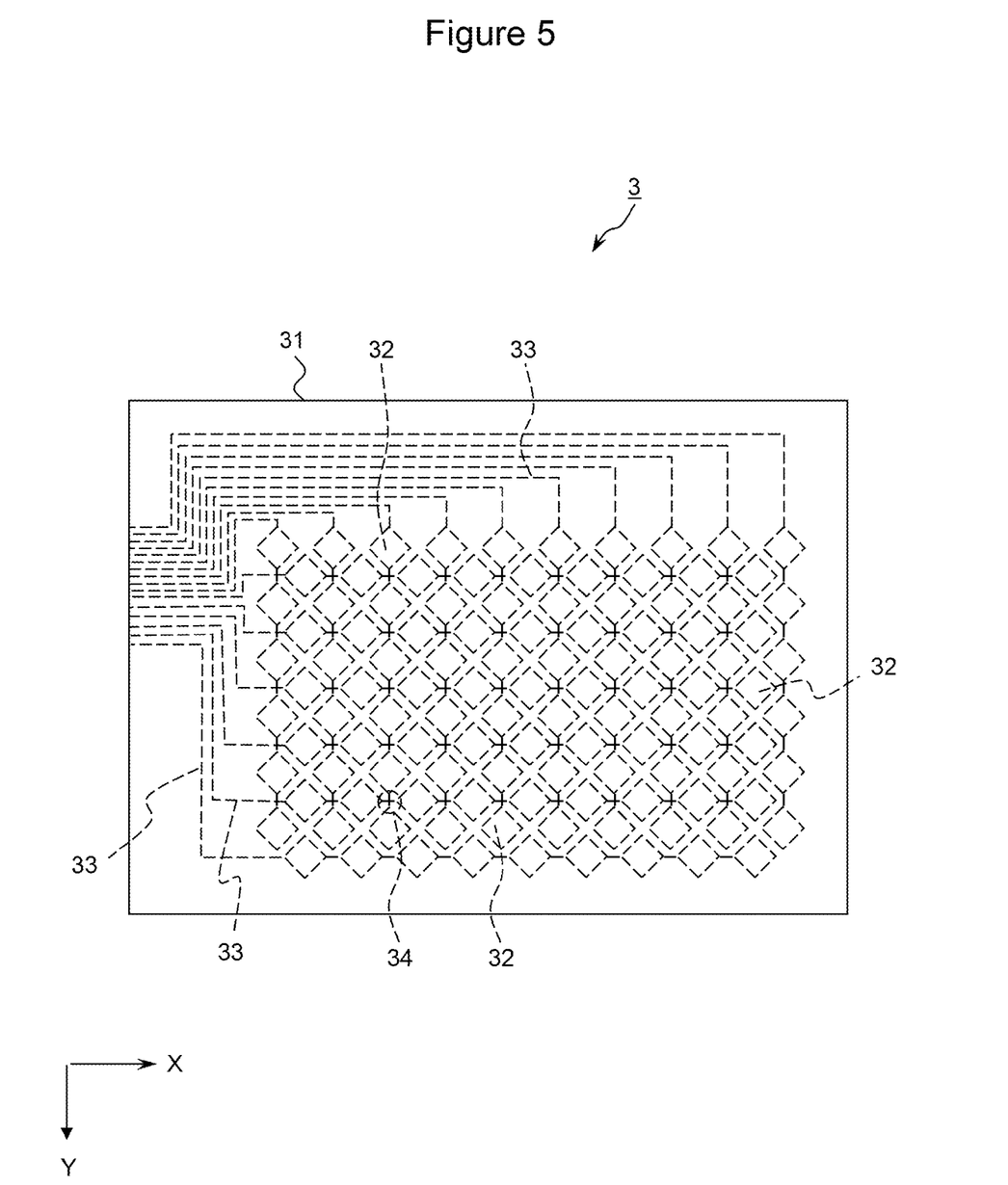
FIG. 5 is a plan view showing the input section.
Figure 6:
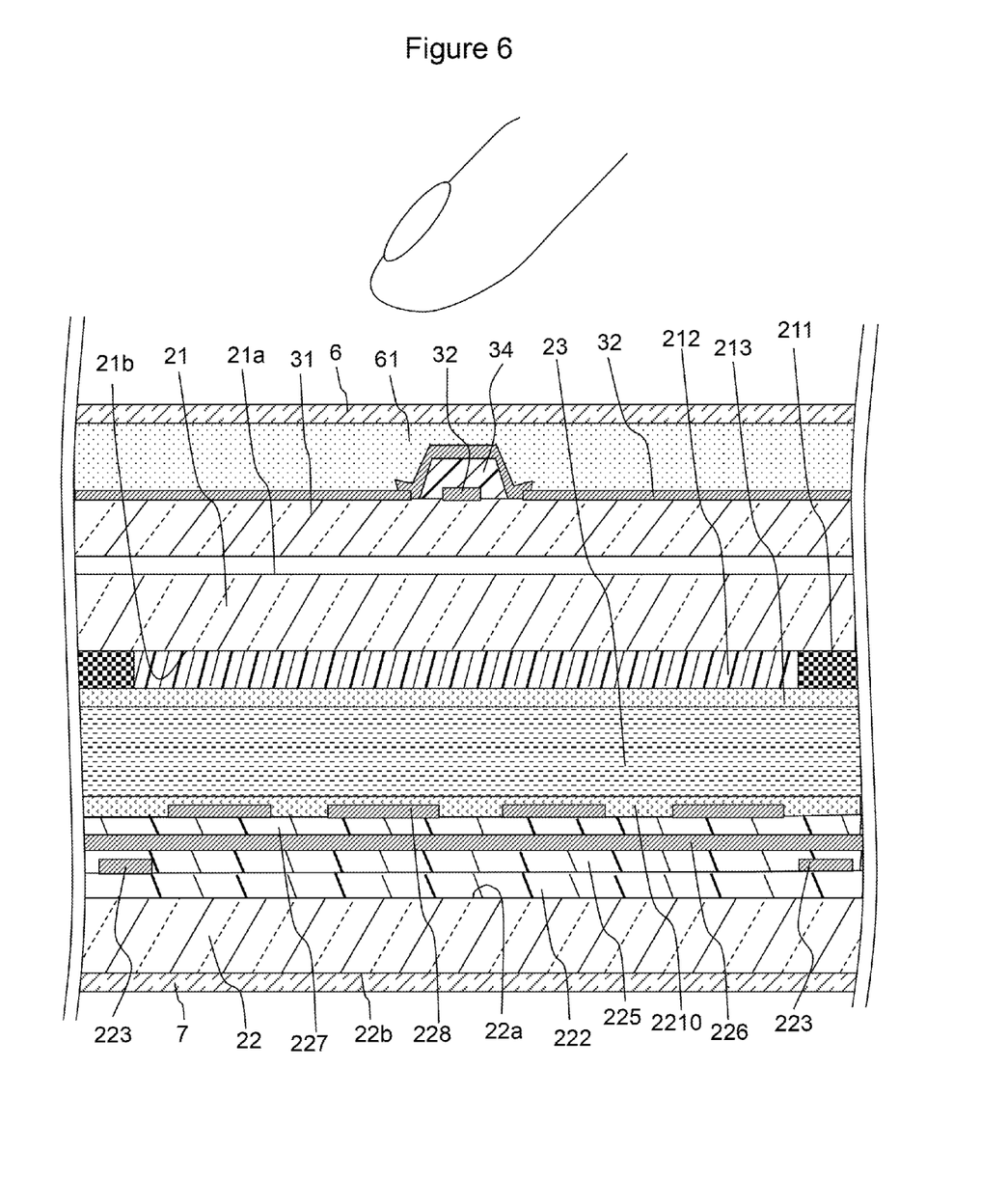
FIG. 6 is a cross-sectional view showing a part of the display device of FIG. 1.

The input section 3, as shown in FIG. 5 and FIG. 6, includes an input section substrate 31, a plurality of detection electrodes 32 arranged along the X and Y directions on the input section substrate 31, a plurality of detection interconnects 33 connected to the detection electrodes 32, and insulators 34 located at the intersections of the detection electrodes 32.

The input section substrate 31 is formed from a translucent material such as glass, plastic, or the like.

The detection electrodes 32 are located on the input section substrate 31 in a region that opposes the input region EI. A plurality of diamond-shaped detection electrodes 32 connected in the Y direction are arranged in the X direction. A plurality of diamond-shaped detection electrodes 32 connected in the X direction are arranged in the Y direction. The detection electrodes 32 arranged in the X direction and the detection electrodes 32 arranged in the Y direction intersect, and insulators 34 are located at the intersection regions thereof.

The material of the detection electrodes 32 can be one having a translucency and electrical conductivity, for example, ITO, IZO, ATO, AZO, tin oxide, zinc oxide, or an electrically conductive polymer, or the like.

The detection interconnects 33 have the function of applying to the detection electrodes 32 a voltage supplied from an input section driver. The detection interconnects 33 are provided in a region facing the non-display region EN on the input section substrate 31. The material of the detection interconnects 33 can be one having electrical conductivity, for example, ITO, tin oxide, aluminum, an aluminum alloy, silver or a silver alloy or the like.

The insulator 34 has the function of electrically insulating between intersecting detection electrodes 32. The insulator 34 is provided on the input section substrate 31 so as to cover a part of the detection electrodes 32. The material of the insulator 34 can be one having a translucency and insulating properties, for example, an acrylic resin or the like.

Next, the input location detection principle of input section 3 will be described.

In the input section 3, because neighboring detection electrodes 32 are disposed in proximity to one another, a floating capacitance occurs between neighboring detection electrodes 32. That is, in the input section 3, a plurality of floating capacitive elements is disposed in a grid-like pattern in the display region $E_D$. When a voltage is applied to the plurality of detection electrodes 32, a charge is accumulated in each floating capacitive element. In this condition, when an input means such as a user's finger comes into contact with the input section 3, there is a change in the floating capacitance of the floating capacitive elements existing at the region of contact with the input section by the finger. Due to this, the charges accumulated in the floating capacitive elements existing at the contact part also change. As a result, the voltage at a plurality of detection electrodes 32 existing in the contact part also changes. This voltage change in the detection electrode 32 is detected by the input section driver as detection means. If the voltage change read by the input section driver exceeds a prescribed value, the input section driver recognizes the detection electrodes 32 at which there was a change of voltage exceeding the prescribed value, and recognizes the intersecting part at the recognized plurality of detection electrodes 32 as the input location.

The vibrating bodies 4 have the function of causing the display device 1 to vibrate in response to pressure by the finger of a user or the like. The vibrating bodies 4, as shown in FIG. 2, are provided on the second primary surface 22b of the second substrate 22 of the display panel 2. As shown in FIG. 3, the vibrating bodies 4 are provided so as to be entirely located within the non-display facing region EFN. The vibrating bodies 4 in the present embodiment overlap with the display interconnects 229. The shape of the vibrating bodies 4 is rectangular when seen in a plan view.

Although two vibrating bodies 4 are provided in the present embodiment, there is no particular restriction regarding the number of vibrating bodies 4.

Electrode terminals 41 are provided on the surfaces of the vibrating bodies 4 facing the second primary surface 22b. Each of the vibrating body interconnects 42 is connected to each of the electrode terminals 41, via an electrically conductive joining member. The material of the electrically conductive joining member can be a metal such as gold, tin, solver, palladium, copper, and nickel, an alloy including these, or a resin including metal particles.

The vibrating body interconnects 42 have the function of applying to the vibrating bodies 4 a voltage supplied from a power supply. The vibrating body interconnects 42 are provided on the second primary surface 22b of the second substrate 22 in the non-display facing region EFN. In the display device 1, a vibrating body interconnect 421 that applies a positive voltage to the vibrating bodies 4, and a vibrating body interconnect 422 that applies a negative voltage to the vibrating bodies 4 are provided. The vibrating body interconnects 42 of the present embodiment are provided so as to surround the non-display facing region EFN. Additionally, the vibrating body interconnects 42 of the present embodiment overlap with the display interconnects 229 when seen in a plan view.

A material of the vibrating body interconnects 42 can be the same one as that of the detection interconnects 33. The detection interconnects 33 may be formed with electrically conductive paste by printing method. When the vibrating body interconnects 42 is formed by the printing method, the thickness of the vibrating body interconnects 42 can be made large, enabling achievement of low resistance and reduction of the power consumption.

In the display device 1, because the vibrating bodies 4 are located on the second primary surface 22b of the second substrate 22 of the display panel 2 and within the non-display facing region EFN, neither a part of nor all of the vibrating bodies 4 is located in the display region ED of the display panel 2 and the outside of the display panel. As a result, it is possible to make effective use of the space of the non-display facing region EFN in disposing the vibrating bodies 4, so that, when providing, it is possible to suppress an increase in the size of the frame of the display device 1, compared to a case in which the vibrating bodies 4 are provided on the input section substrate 31 of the input section 3.

The vibrating bodies 4 in the present embodiment are piezoelectric elements using the so-called piezoelectric effect to convert a force applied thereto to a voltage and to convert a voltage applied thereto via the electrode terminals 41 to a force (vibration). Although the vibrating bodies 4 in the present embodiment are bimorph piezoelectric elements constituted by a plurality of piezoelectric bodies adhered together, this is not a restriction, and the vibrating bodies 4 may be monomorph piezoelectric elements. In the bimorph piezoelectric elements, by applying a differential voltage to each of the plurality of piezoelectric bodies, because the expansion and contraction directions of the plurality of piezoelectric bodies are in opposition, warping occurs of the piezoelectric elements 4, and therefore the piezoelectric elements 4 vibrate.

Although in the aforementioned embodiment, explained is an example in which the vibrating bodies 4 are realized by piezoelectric elements, this is not restriction. For example, realization may be done by electromagnetic vibrating bodies, or a motor, or the like.

The light source device 5 has the function of emitting light directed toward the display region ED of the display panel 2. The light source device 5 includes a light source 51 and a light-guiding sheet 52. Although a point light source such as an LED is used as the light source 51 in the light source device 5 in the present embodiment, a line light source such as a cold cathode tube may be used. The light-guiding sheet 52 of the light source device 5 is fixed to the second primary surface of the second substrate 22 via a shock-absorbing supporting body S.

The first polarizing sheet 6 has the function of selectively passing light of a prescribed vibration direction. The first polarizing sheet 6 is provided on the input section 3 via an adhesive 61. Although the first polarizing sheet 6 is located on the input section 3 in the present embodiment, this is not a restriction. For example, it may be provided between the first primary surface 21a of the first substrate 21 and the input section 3.

The second polarizing sheet 7 has the function of selectively passing light of a prescribed vibration direction. The second polarizing sheet 7 is located on the second primary surface 22b of the second substrate 22.

The second polarizing sheet 7 is provided so as not to overlap with the vibrating bodies 4. If the second polarizing sheet 7 overlaps with a vibrating body 4, the second polarizing sheet 7 will be separated from the second substrate 22 by the thickness of the vibrating body 4, and there is a possibility that the thickness of the display device 1 will increase. In contrast, by not having the second polarizing sheet 7 overlap with the vibrating bodies 4, it is possible to suppress an increase in the thickness of the display device 1.

Second Embodiment

Figure 7:
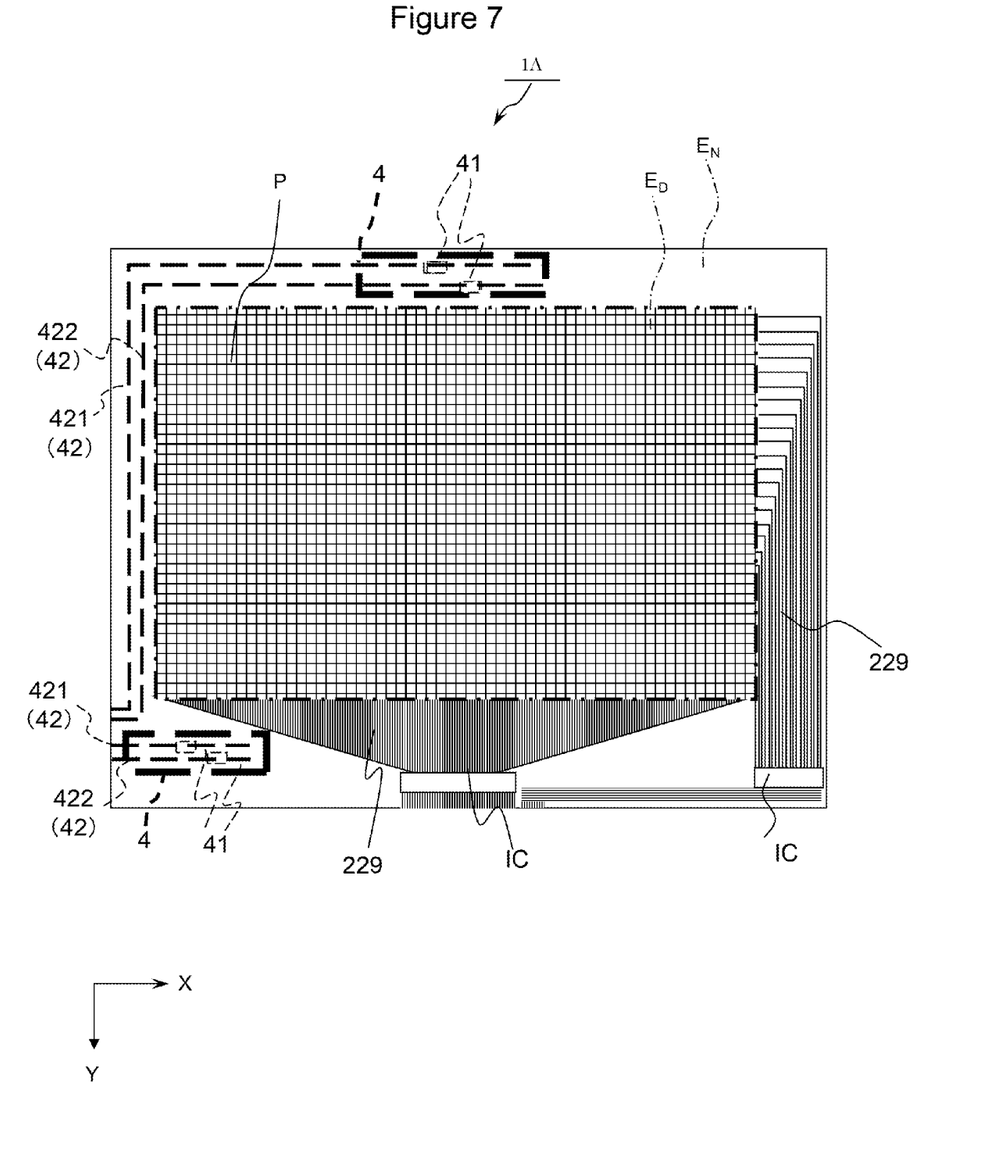
FIG. 7 is a plan view showing the main part of a display device of a second embodiment of the present invention.

FIG. 7 shows the main part of a display device 1A according to the second embodiment.

The display device 1A differs from the display device 1 in that the vibrating bodies 4 are located in a region of the display device 2 in which the display interconnects 229 are not formed.

The voltage applied for causing the vibrating bodies 4 to vibrate is larger than the voltage applied to the display interconnects 229 connected to the gate interconnects 221, the source interconnects 223 and the common electrode 226. As a result, there is a possibility that an electromagnetic wave generated by the voltage applied to the vibrating bodies 4 influences, as noise, the signals that travel along the display interconnects 229 and influences the image display.

In contrast, in the display device 1A, because the vibrating bodies 4 are located in a region of the display device 2 in which the display interconnects 229 are not formed so that the vibrating bodies 4 do not overlapped with the display interconnects 229, the influence of the voltage applied to the vibrating bodies 4 on the display interconnects 229 can be reduced.

Also, in the display device 1A, the vibrating body interconnects 42 are located a region of the display panel 2 in which the display interconnects 229 are not formed, and are provided so that there is no overlap with the display interconnects 229 of the display panel 2. As a result, the influence, of the electromagnetic wave generated by the voltage applied to the vibrating body interconnects 42, on the display interconnects 229 can be reduced.

Third Embodiment

Figure 8:
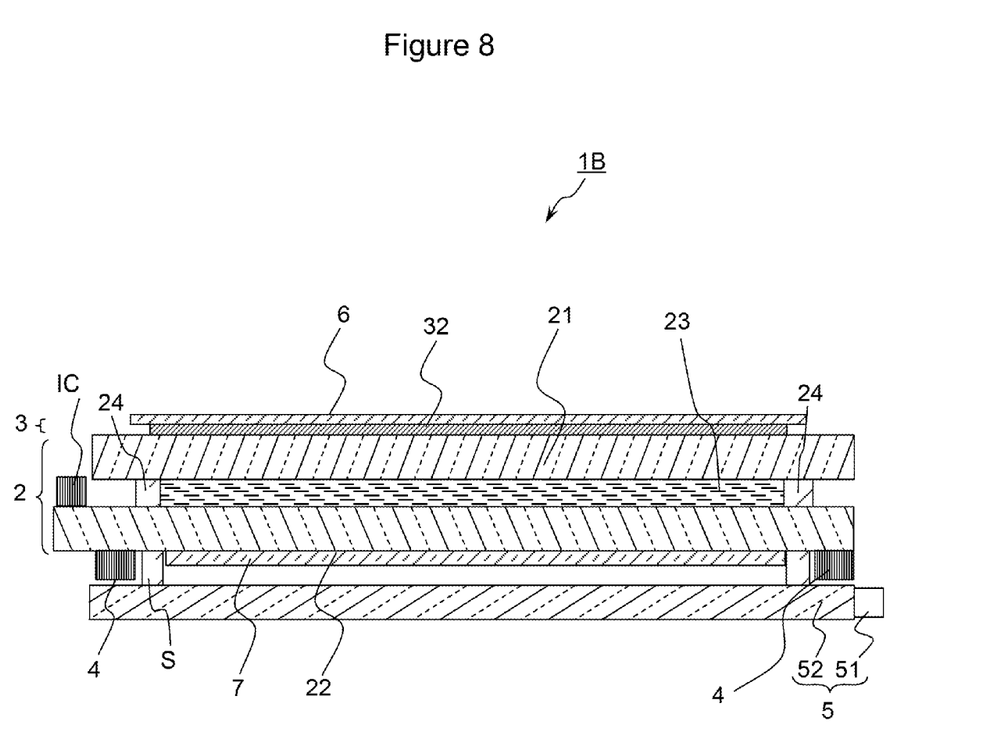
FIG. 8 is a cross-sectional view showing a display device of a third embodiment of the present invention.
Figure 9:
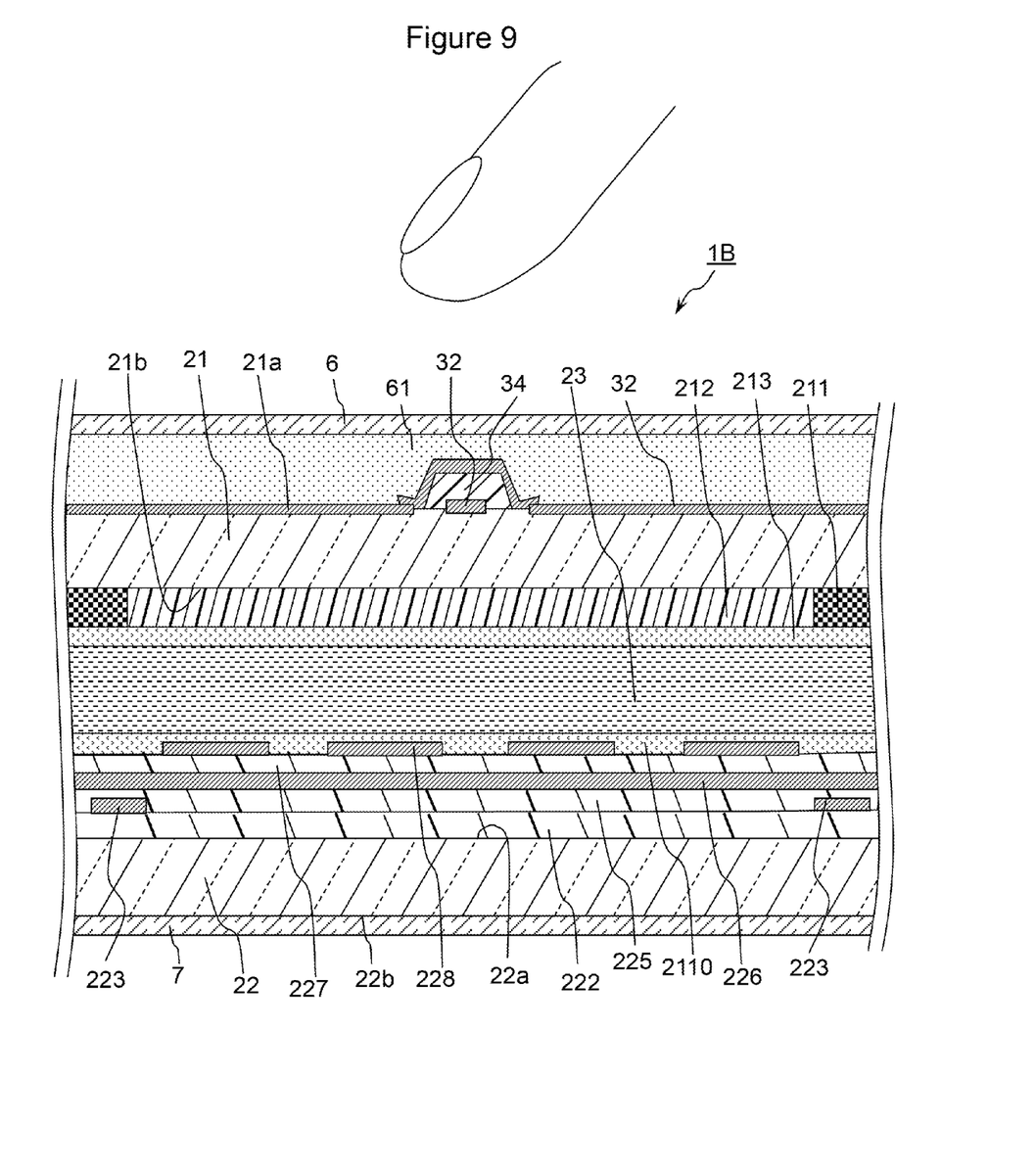
FIG. 9 is a cross-sectional view showing a part of the display device of FIG. 8.

FIG. 8 and FIG. 9 show a display device 1B according to the third embodiment.

The display device 1B differs from the display device 1 in that the input section 3 does not include an input section substrate 31.

In the display device 1B, the detection electrodes 32 of the input section 3 are provided in contact with the first primary surface 21a of the first substrate 21. With this, the space provided between the input section substrate 31 of the input section 3 and the first primary surface 21a of the first substrate 21 can be eliminated, and the thickness of the display device 1 can be reduced.

In addition, by eliminating the above-noted space, because the air layer in the space is eliminated, when external light such as sunlight and illumination light strikes the display panel 2, reflection of light at the boundary between the input section substrate 31 and the air layer and at the boundary between the air layer and the first substrate is eliminated, enabling reduction of occurrence of background reflection, and improvement of the display quality.

Also, because the input section 3 does not have an input section substrate 31, transfer of the vibration of the vibrating bodies 4 to the user is facilitated.

Fourth Embodiment

Figure 10:
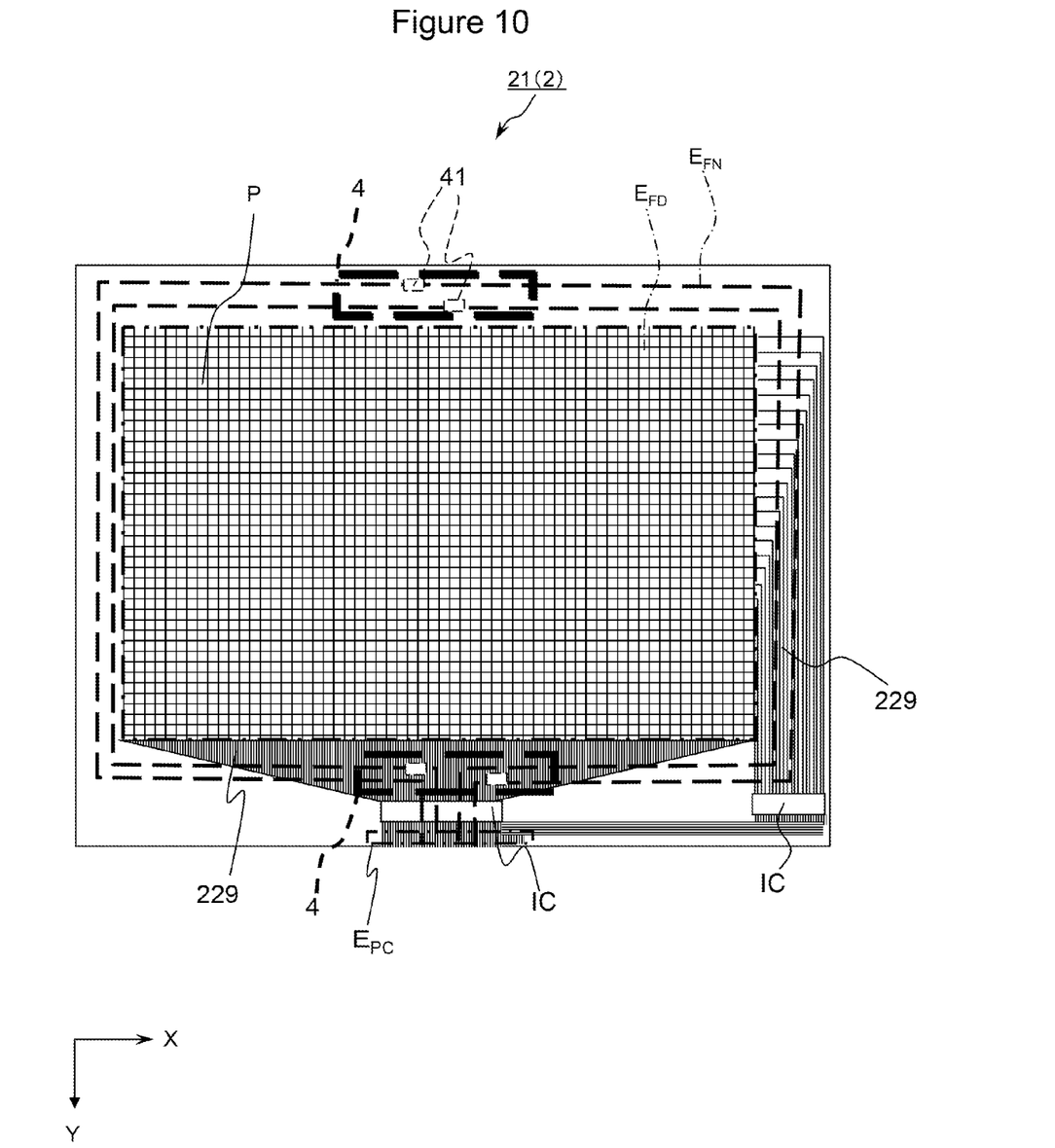
FIG. 10 is a plan view showing the main part of a display device of a fourth embodiment of the present invention.

FIG. 10 shows a display device 1C according to the fourth embodiment.

The display device 1C differs from the display device 1 in that both ends of the vibrating body interconnects 42 are located in an external connection region EPC that connects to an external circuit board (non-illustrated) such as a flexible circuit board.

The external connection region EPC is a region, which the external circuit board faces, of the first primary surface 22a and second primary surface 22b of the second substrate 22. In the external connection region EPC, electrode terminals of the display panel 2 and electrode terminals of the external circuit board are connected, via electrically conductive joining members.

In the display device 1C, because not only the electrode terminals of the display panel 2, but also both ends of the vibrating body interconnects 42 are located in the external connection region EPC, the electrode terminals of the display panel 2 and the vibrating body interconnects 42 of the vibrating bodies 4 can be connected by a common external circuit board. That is, because it is not necessary to separately provide an external circuit board for the display panel 2 and an external circuit board for the vibrating bodies 4, the number of parts can be reduced.

DESCRIPTION OF THE REFERENCE NUMERALS

1, 1A, 1B, 1C Display device
2 Display panel
21 First substrate
21a First primary surface (outer primary surface)
ED Display region
P Pixel
EN Non-display region
EI Input region
21b Second primary surface (interior primary surface)
211 Light-blocking film
212 Color filter
213 First orientation film
22 Second substrate
22a First primary surface (interior primary surface)
EFD Display opposing region
EFN Non-display opposing region
22b Second primary surface (outer primary surface)
221 Gate interconnect
222 First insulating film
223 Source interconnect
224 Thin-film transistor
225 Second insulating film
226 Common electrode (display electrode)
227 Third insulating film
228 Signal electrode (display electrode)
229 Display interconnect
2210 Second orientation film
23 Liquid crystal layer
24 Joining member (vibration transmission member)
IC Driver
3 Input section
31 Input section substrate
32 Detection electrode
33 Detection interconnect
34 Insulator
T Sealing member
4 Vibrating body
41 Electrode terminal
42 (421, 422) Vibrating body interconnect
5 Light source device
51 Light source
52 Light-guiding sheet
S Supporting body
6 First polarizing sheet
61 Adhesive
7 Second polarizing sheet

What is claimed is:

1. A touch panel display device comprising:
   a first substrate comprising:
     a display region and an input region on an outer primary surface thereof; and
     an input section for detecting an input location in the input region;
   a second substrate disposed such that a first primary surface thereof and that of the first substrate face each other;
   a display part, disposed between the first substrate and the second substrate, for displaying image information in the display region;
   a vibrating body located on the second substrate;
   a vibration transmission member disposed between the first substrate and the second substrate;
   wherein the vibrating body is entirely provided on a non-display facing region, which faces a non-display region that excludes the display region, within a second primary surface of the second substrate; and
   a driver integrated circuit (IC) provided on the first primary surface of the second substrate such that the driver IC does not overlap with the vibrating body.

2. The touch panel display device according to claim 1, wherein
   a display electrode is located on a display facing region facing the display region on the interior primary surface of the second substrate, a display interconnect which is coupled to the display electrode is located on the non-display facing region of the interior primary surface of the second substrate, and the vibrating body is located, when seen in a plan view, in a non-forming region of the display interconnect of the non-display facing region.

3. The touch panel display device according to claim 2, wherein a vibrating body interconnect which is coupled to the vibrating body is located on the non-display facing region of the outer primary surface of the second substrate, and the vibrating body interconnect is located, when seen in a plan view, in a non-forming region of the display interconnect on the non-display facing region.

4. The touch panel display device according to claim 1, further comprising a polarizing sheet on the outer primary surface of the second substrate, and the polarizing sheet is provided so as not to overlap with the vibrating body.

5. The display device according to claim 1, wherein the input section comprises a detection part that detects a change of a capacitance occurring at a position of input in the input section.

6. The display device according to claim 5, wherein the input section comprises a detection electrode, and a detection interconnect for communicating the capacitance change to the detection means part, and the detection electrode is located in the input region of the outer primary face or interior primary face of the first substrate, and the detection interconnect is located in a region of the outer primary face or interior primary face of the first substrate that excludes the display region and the input region.

7. The touch panel display device according to claim 1, wherein a liquid crystal layer is located between the first substrate and the second substrate.

8. The display device according to claim 1, wherein a light-emitting layer is located between the first substrate and the second substrate.

* * * * *